(12) United States Patent
Mayer (10) Patent No.: US 10,207,478 B2
(45) Date of Patent: Feb. 19, 2019

(54) LID FILM FOR FOOD PACKAGING

(71) Applicant: AMCOR FLEXIBLES SINGEN GMBH, Singen (DE)

(72) Inventor: Susanne Mayer, Steisslingen (DE)

(73) Assignee: AMCOR FLEXIBLES SINGEN GMBH, Singen (DE)

( * ) Notice: Subject to any disclaimer, the term of this patent is extended or adjusted under 35 U.S.C. 154(b) by 0 days.

(21) Appl. No.: 15/511,947

(22) PCT Filed: Sep. 23, 2015

(86) PCT No.: PCT/EP2015/001888
§ 371 (c)(1),
(2) Date: Mar. 16, 2017

(87) PCT Pub. No.: WO2016/045792
PCT Pub. Date: Mar. 31, 2016

(65) Prior Publication Data
US 2017/0291396 A1    Oct. 12, 2017

(30) Foreign Application Priority Data
Sep. 23, 2014 (EP) .................................. 14003282

(51) Int. Cl.
*B32B 3/00* (2006.01)
*B32B 15/08* (2006.01)
(Continued)

(52) U.S. Cl.
CPC .............. *B32B 15/08* (2013.01); *B32B 3/085* (2013.01); *B32B 15/085* (2013.01); *B32B 15/20* (2013.01);
(Continued)

(58) Field of Classification Search
CPC ....... B32B 15/08; B32B 15/085; B32B 15/20; B32B 3/085; B32B 2255/26;
(Continued)

(56) References Cited

U.S. PATENT DOCUMENTS 6,200,663 B1    3/2001  Zuser

FOREIGN PATENT DOCUMENTS

DE    19825777 A1    12/1999
DE    20300352 U1    3/2003
(Continued)

OTHER PUBLICATIONS

International Search Report and Written Opinion for International Application No. PCT/EP2015/001888, dated Nov. 11, 2015—9 Pages.

*Primary Examiner* — Elizabeth E Mulvaney
(74) *Attorney, Agent, or Firm* — RatnerPrestia (57) ABSTRACT

The present invention relates to a lid film for packaging of e.g. human or pet food. The lid film has a multi-layer structure and comprises a sealing layer, a barrier layer, a print primer layer, a print layer, an optional print protection layer, and a relief layer. The sealing layer, the barrier layer, the print primer layer, the print layer and the optional print protection layer are essentially flat. The relief layer is arranged at least on a part of the print layer and comprises at least n three dimensional structures per $cm^2$ projecting at an essentially right angle from a surface of the adjacent print layer or the optional print protection layer and said three dimensional structures forming an non-continuous elevated surface, wherein the total of said elevated surface area formed by the three dimensional structures equals at least m % of a total surface area of the lid film and wherein the three dimensional structures have a minimal height of 5 μm.

19 Claims, 12 Drawing Sheets

(51) Int. Cl.
  *B32B 15/085*  (2006.01)
  *B32B 15/20*  (2006.01)
  *B32B 3/08*  (2006.01)
  *B65D 75/32*  (2006.01)
(52) U.S. Cl.
  CPC ........ *B65D 75/325* (2013.01); *B32B 2255/26* (2013.01); *B32B 2255/28* (2013.01); *B32B 2307/308* (2013.01); *B32B 2435/02* (2013.01)
(58) Field of Classification Search
  CPC .......... B32B 2255/28; B32B 2307/308; B32B 2435/02; B65D 75/325
  See application file for complete search history.

(56) References Cited

FOREIGN PATENT DOCUMENTS

| | | | |
|---|---|---|---|
| EP | 1340694 | A2 | 9/2003 |
| EP | 1935805 | A1 | 6/2008 |
| WO | 9826931 | A1 | 6/1998 |
| WO | 0168475 | A1 | 9/2001 |

LID FILM FOR FOOD PACKAGING

CROSS-REFERENCE TO RELATED APPLICATIONS

This is the national phase of International Application No. PCT/EP2015/001888, filed 23 Sep. 2015, which claims priority to European Application No. 14003282.2, filed 23 Sep. 2014. The disclosure of each of these applications is incorporated herein by reference in its entirety for all purposes.

FIELD OF THE INVENTION

This invention relates to a lid film for food packaging of human or pet food and also to a method for the manufacturing such a lid film.

BACKGROUND OF THE INVENTION

Food products are usually stored in some kind of packaging, be it a film that is wrapped or folded around the food product or be in containers made of aluminium foil or plastics. The shelf life of packaged food is integrally related to its packaging and the product conditions. Retort technology systems use steam or superheated water to cook or sterilize food in its own package, thus extending shelf life and ensuring food safety. Obviously, such a production process requires packaging materials withstanding the production conditions. A widely used packaging in connection with retort food products is a semi-rigid or rigid container wherein the food product is filled and which container is subsequently closed with a lid sealed to the container thereby covering its opening. Containers and lids are manufactured as separate parts and delivered to manufacturer of the food product to be packed. The lids are usually delivered in stacks. These stacks are fed to the packaging machine that uses the lids to close the food package. Since lids are stored in the form of stacks comprising thousands of single lids, they have to be separated before such a lid is sealed to a food container. The fast and reliable separation of these lids poses a problem having its cause in an effect known as the glass plate effect.

This glass plate effect occurs when thin flat objects having a smooth surface are stacked and tend to stick to each other when these flat objects are removed from the stack in order to be used. This unintentional sticking of such thin flat object is also encountered in the case of lids used in food packaging and may seriously hamper the production process.

In order to achieve a fast and reliable separation of lids from a stack it is necessary to create some kind of surface structure. In the state of the art this has been done by embossing the lids. However, although the glass plate effect can be eliminated by embossing the lids, embossing itself causes some serious disadvantages. Since the embossing step of a lid is done after it has been printed on, the embossing causes cracks in the print layer. Depending on the inks used and the area size printed on these cracks are visible. Further, the sterilization or cooking step of the packed food product, a step usually done in retort packaging, worsens the problem since it may result in corrosion. This problem comes with inks used in UV-flexo printing, independently of the UV-flexo inks containing bisphenol A (BPA) or not. In the case of BPA free UV flexo inks the problem of embossing induced cracks is so severe that these inks cannot be used until now. However, it would be highly desirable to use BPA free UV flexo inks in food packaging as the potentially harmful BPA may migrate into packed food product thus increasing exposure of the consumer to this compound. There is a tendency towards restricting the use of BPA in food packaging, for instance France has recently banned its use in food packaging.

In addition, since the embossing causes spikes and dents that go right through the entire lid film, cracks are also found on the side of the lid film sealed to the container, the inner side of the film. In connection with "aggressive" food contents, e.g. sour or alkaline foods, the cracks result in corrosion, thus imposing limitations in the nature of the food contents. Avoiding an embossing step would significantly decrease susceptibility of lid films to corrosion caused by "aggressive" food contents.

So far, no other solution different from embossing has been employed to eliminate the glass plate effect.

SUMMARY OF THE INVENTION

An object of the present invention is to provide a lid film which does not show a glass plate effect without the need of embossing in order to achieve a structured surface and thereby avoiding the specific disadvantages associated with the embossing of the lid film. Another object of the present invention is to allow the use of BPA free printing inks without increasing the risk of corrosion of the lid film.

The object is achieved by a lid film according to the present invention as defined in claim 1. A method for the manufacturing of said lid film is defined in claim 13. Further embodiments are subject to the dependent claims.

A lid film according to the present invention has multi-layer structure. The lid film comprises a sealing layer, a barrier layer, a print primer layer, a print layer and a relief layer. In between the print layer and the relief layer an optional print protection layer may be arranged. The sealing layer, the barrier layer, the print primer layer, the print layer and also the optional print protection layer are essentially flat. The relief layer which is arranged at least on a part of the print layer comprises at least n three dimensional structures per $cm^2$ projecting at an essentially right angle from a surface of the adjacent print layer or, if present, the optional print protection layer. The minimum number n of the three dimensional structures present per $cm^2$ is n=1. The three dimensional structures form a non-continuous elevated surface, whereby the total of said non-continuous elevated surface formed by the three dimensional structures equals at least m % of a total surface area of the lid film whereby m is at least 10%. The three dimensional structures have a minimal height of 5 µm.

DETAILED DESCRIPTION OF CERTAIN EMBODIMENTS OF THE INVENTION

The lid film according to the present invention allows a simplified manufacturing of the lid film. The relief lacquer can be applied in a UV flexo print machine, i.e., after application of the print layer. No embossing step is needed. The lid film does not show any significant glass plate effect. In addition, since embossing induced cracks are avoided, the lid film according to the present invention shows a much higher resistance to sterilization since almost no corrosion occurs on the print side of the lid. As the sealing side of the lid film is essentially flat there is also an improved resistance to corrosion and additionally to aggressive products on the inner side of the lid film. Further, the lid film allows using Bisphenol A free printing inks which are especially prone to cracks and could therefore not be used so far. The printing which is also found on prior art lid films does not form any relief that would reduce the glass plate effect. It is presumed to be too flat in order to exert any effect.

The number of three-dimensional structures per $cm^2$ comprises all three-dimensional structures that are wholly arranged within a $cm^2$. Three-dimensional structures extending to more than one $cm^2$, be it by their length, width or area, are counted as 1 three-dimensional structure per $cm^2$ to which they extend.

In a preferred embodiment the number n of the three-dimensional structures per $cm^2$ that the relief layer comprises is in the range of 1 to 100, preferably in the range of 3 to 50, and most preferably in the range of 4 to 10.

In another embodiment the non-continuous elevated surface, expressed in percent of the total surface area of the lid, is m % whereby m is in the range of 10% to 50%, preferably in the range of 15% to 40%, and most preferably in the range of 20% to 30%.

In a further embodiment the three dimensional structures of the relief layer are randomly arranged on the surface of the print layer or—if present—on the surface of the optional print protection layer. The random arrangement of the three dimensional structures effectively prevents any stronger adhesion between stacked lid films that could result in a glass plate effect.

In another embodiment the three dimensional structures of the relief layer are arranged on the surface of the print layer or on the surface of the optional print protection layer in a regular array, e.g. in a dot grid. UV flexo print allows a vast number of arrangements, e.g. dots, lines or other simple geometric forms. The combination of such regular arrangements allows achieving different visual effects.

Although the relief layer has to be arranged at least on a part of the surface of the print layer, it may also be arranged on the whole surface of the print layer or—if present—on the optional print protection layer. The sealing area running along the rim of the lid is preferably free of the relief layer.

The relief layer may comprise inks or lacquers. In another preferred embodiment the relief layer is made of, preferably bisphenol A free UV-flexoprint inks. Said inks may be colored or colorless and do preferably not comprise any solvents. UV-flexoprint inks are cured by UV radiation.

In a further preferred embodiment the relief layer is made of a colorless lacquer. Examples of colorless lacquers are acrylic lacquers. Acrylic lacquers comprise an acrylic resin or a mixture of several different acrylic resins as well as one photoinitiator or a mixture of several different photoinitiators. Acrylic lacquers undergo radical polymerization in the course of hardening. The radical polymerization may be initiated by UV radiation.

In a further embodiment the lacquer, e.g. the acrylic lacquer mentioned above, is a colored lacquer. These lacquers comprise one or more pigments imparting the lacquer the color. Such pigments are for instance titan dioxide (white), iron oxide, yielding a red or black color depending on the oxide, and azo-based pigments. The relief layer may comprise more than one colored lacquers.

In another embodiment of the lid film the three dimensional structures of the relief layer have a height in the range of 5 µm to 45 µm, preferably in the range of 7 µm to 30 µm and more preferably in the range of 16 µm to 22 µm. Most preferably the height of the three dimensional structures is approximately 20 µm. Whereby the height is measured from the surface of the lid film the three-dimensional structures project at an essentially right angle to the top or end face of the three-dimensional structures.

The lacquer or ink of the relief layer has a grammage of 1 $g/m^2$ to 10 $g/m^2$, preferably in the range of 2 $g/m^2$ to 8 $g/m^2$, more preferably in the range of 2 $g/m^2$ to 5 $g/m^2$.

In a further embodiment the sealing layer comprises the polymer polypropylene. The sealing layer preferably has a thickness in the range of 15 µm to 35 µm, more preferably around 25 µm. Further materials that may be used as sealing materials are polyethylene (PE), polyesters and heat sealing lacquers.

In another embodiment the barrier layer comprises aluminium. The barrier layer has preferably a thickness in the range of 20 µm to 90 µm, preferably in the range of 40 µm to 80 µm and more preferably in the range of 60 µm to 70 µm. In a further embodiment a food pack comprises a lid according to the present invention.

The lid film is preferably sterilizable. This means the lid film withstands typical sterilization procedures used in retort food packaging. Importantly, the food product is first filled in its container, said container is sealed with an appropriate lid film before the sterilization procedure takes place. Such a sterilization procedure is for instance autoclaving using high pressure saturated steam. Usually, the packed product which is to be sterilized is exposed to superheated steam at a temperature of 121° C. and an elevated pressure of 2 bar for 20 minutes. Typically, the conditions of sterilization procedures are in within the following ranges, the temperature is between 120° to 130° C., the pressure is between 2 to 3 bar, and the duration is between 20 to 45 minutes. Of course, the sterilization procedures may be varied according to the desired level of sterility. The lid film according to the present invention can undergo such a sterilization process without deterioration, i.e., without significant crack formation in the print and/or relief layer and without increased corrosion susceptibility of the lid film.

The lid film may further comprise an opening flap. The opening flap is arranged at the edge of the lid film whereby the size and the shape may vary. The opening flap is at least partly covered by the relief layer. It may preferably also be fully covered by the relief layer. The opening flap may for instance be formed by a small, bell-shaped area at the edge of the lid film, said bell-shaped area protruding an edge of container the lid film is sealed to. The opening flap does not necessarily protrude the edge of the container the lid film is sealed to. The opening flap may also be formed by a small, bell-shaped non-sealing area at the edge of the lid film. The size of such a non-sealing area is limited due to the necessity that the remaining sealing area must provide the desired seal strength. The relief layer covering the opening flap provides a better grip when one pinches the opening flap on a sealed container. The overall haptic touch is improved.

A method for the manufacture of a lid film according to the present invention comprises the following steps, a barrier layer is coated on one side with a sealing layer and on the opposite side with a print primer layer. The coating may be done by extrusion coating. In a subsequent step a print layer is arranged on top of the print primer layer by way of printing, preferably using BPA free printing inks. Optionally, a print protection layer may be arranged on top of the print layer. In a further step, a relief layer is applied on the print layer or—if present—on the optional print protection layer. The relief layer is also applied by printing, whereby the relief layer is made of a colorless or a colored, preferably BPA free lacquer or ink. A colorless lacquer or ink is preferred. In a last step the lid film is die cut and the single lid films are stacked for storage.

In a preferred embodiment of the method the printing is done by UV-flexoprint. Preferably, the colorless or colored lacquer is bisphenol A free. Further, preferably the lid film is sterilizable.

The following illustrates two typical lid film structures. The different layers are from inside to outside:

FIRST EXAMPLE

Sealing layer: polypropylene, 25 µm, 22.55 g/m$^2$
Barrier layer: aluminium, 60 µm
Print primer layer: print primer 2K, 1.5 g/m$^2$
Print layer: UV flexo print inks, 2.5 g/m$^2$ to 4.0 g/m$^2$
Relief layer: colorless lacquer, 17 µm, 1.0 g/m$^2$

SECOND EXAMPLE

Sealing layer: polypropylene, 25 µm, 22.55 g/m$^2$
Barrier layer: aluminium, 60 µm
Print primer layer: print primer 2K, 1.5 g/m$^2$
Print layer: UV flexo print inks, 2.5 g/m$^2$ to 4.0 g/m$^2$
Print protections layer: colorless UV flexo print lacquer, 1.5 g/m$^2$ to 2.0 g/m$^2$
Relief layer: colorless lacquer, 17 µm, 1.0 g/m$^2$ The lid film according to the present invention is explained in more detail below with reference to exemplary embodiments in the drawings, in which, purely schematically:

Figure 1:
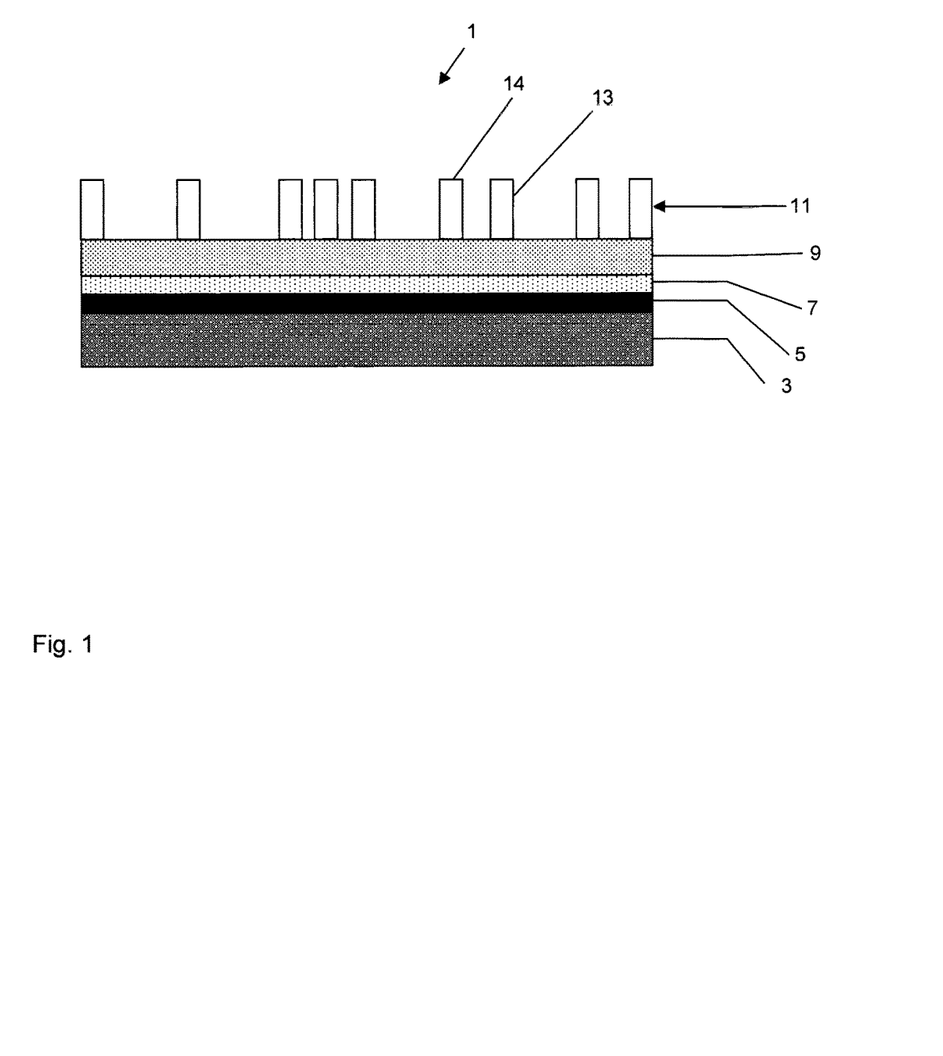
FIG. 1 shows a first embodiment of a lid film.

FIG. 1 shows a first embodiment of lid film 1 according to the present invention. The lid film 1 comprises a sealing layer 3, arranged on one side of a barrier layer 5. On the side of the barrier layer 5 opposite to the sealing layer 3, there is a print primer layer 7 arranged. On top of the print primer layer 7 the print layer 9 is arranged. The relief layer 11 is then arranged on the print layer 9. As illustrated in this embodiment the three dimensional structures 13 are arranged in a random manner. The three-dimensional structures 13 form a non-continuous elevated surface 14.

Figure 2:
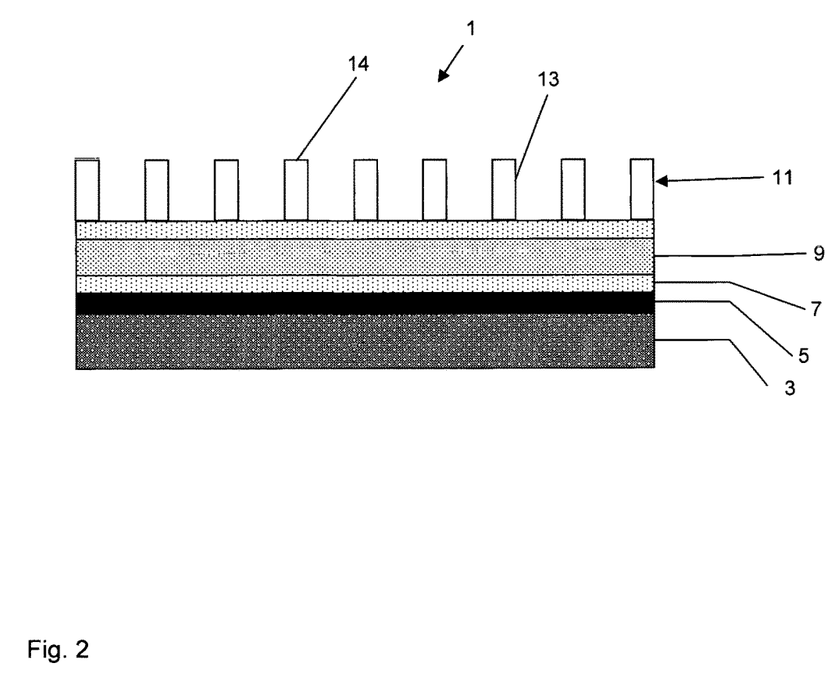
FIG. 2 shows a second embodiment of the lid film.

FIG. 2 shows a second embodiment of lid film 1 according to the present invention. The lid film 1 comprises a sealing layer 3, arranged on one side of a barrier layer 5. On the side of the barrier layer 5 opposite to the sealing layer 3, there is a print primer layer 7 arranged. On top of the print primer layer 7 the print layer 9 is arranged. The print layer 9 is sandwiched between the print primer layer 7 and the print protection layer 15. The relief layer 11 is then arranged on the print protection layer 15. In this embodiment the three dimensional structures 13 are arranged in a regular array. The three-dimensional structures 13 form a non-continuous elevated surface 14.

Figure 3:
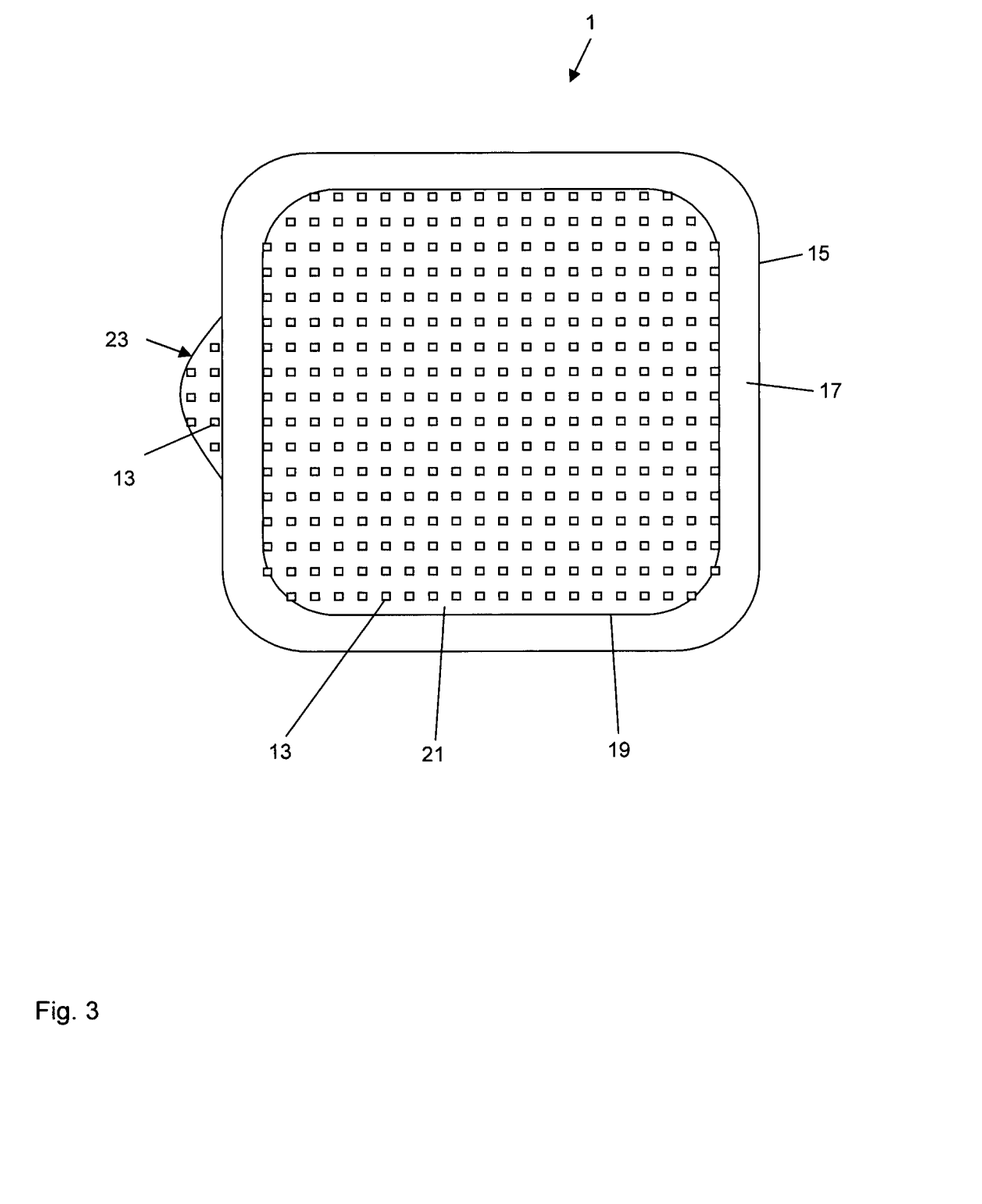
FIG. 3 shows an embodiment of the lid film with a first type of three-dimensional structures.

FIG. 3 shows an embodiment of the lid film 1 comprising a first type of three-dimensional structures 13. The sealing area 17 running along the outer edge 15 of the lid film 1 and being arranged between the outer edge 15 and the margin 19 of central area 21 of the lid film 1 is essentially free of three-dimensional structures 13. The three-dimensional structures 13 are regularly arranged in an array in the central area 21 and have an essentially quadratic shape. Also shown is an opening flap 23 arranged at the edge 15 which is fully covered with the three-dimensional structures 13 that form the relief layer. The opening flap 23 protrudes the edge of a container (not shown) the lid film 1 is sealed to.

Figure 4:
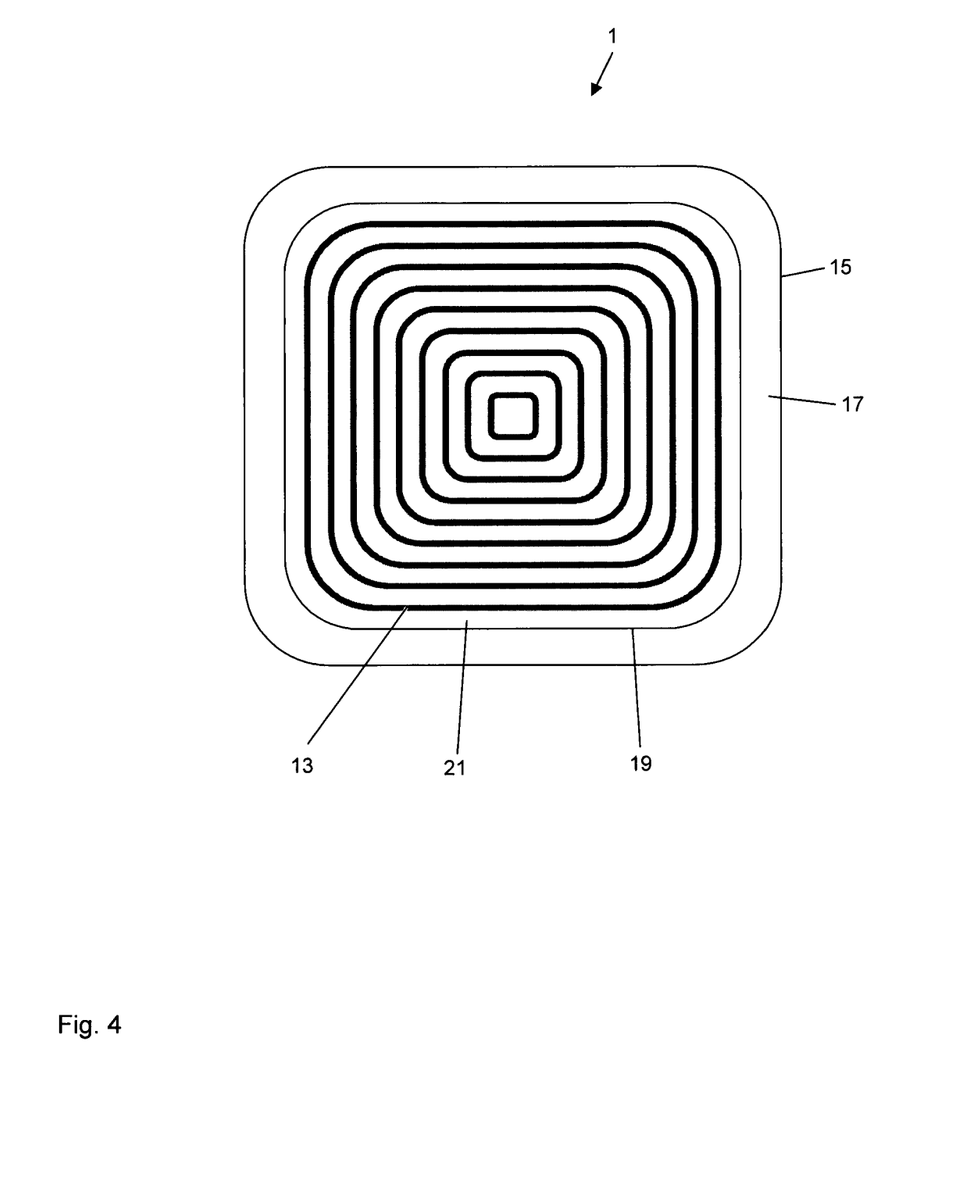
FIG. 4 shows a further embodiment of the lid film with a second type of three-dimensional structures.

FIG. 4 shows a further embodiment of the lid film 1. The three-dimensional structures 13 are concentric, closed lines having an essentially quadratic shape and rounded corners arranged in the central area 21. The sealing area 17 arranged between the edge 15 and the margin 19 is free of three-dimensional structures 13.

Figure 5:
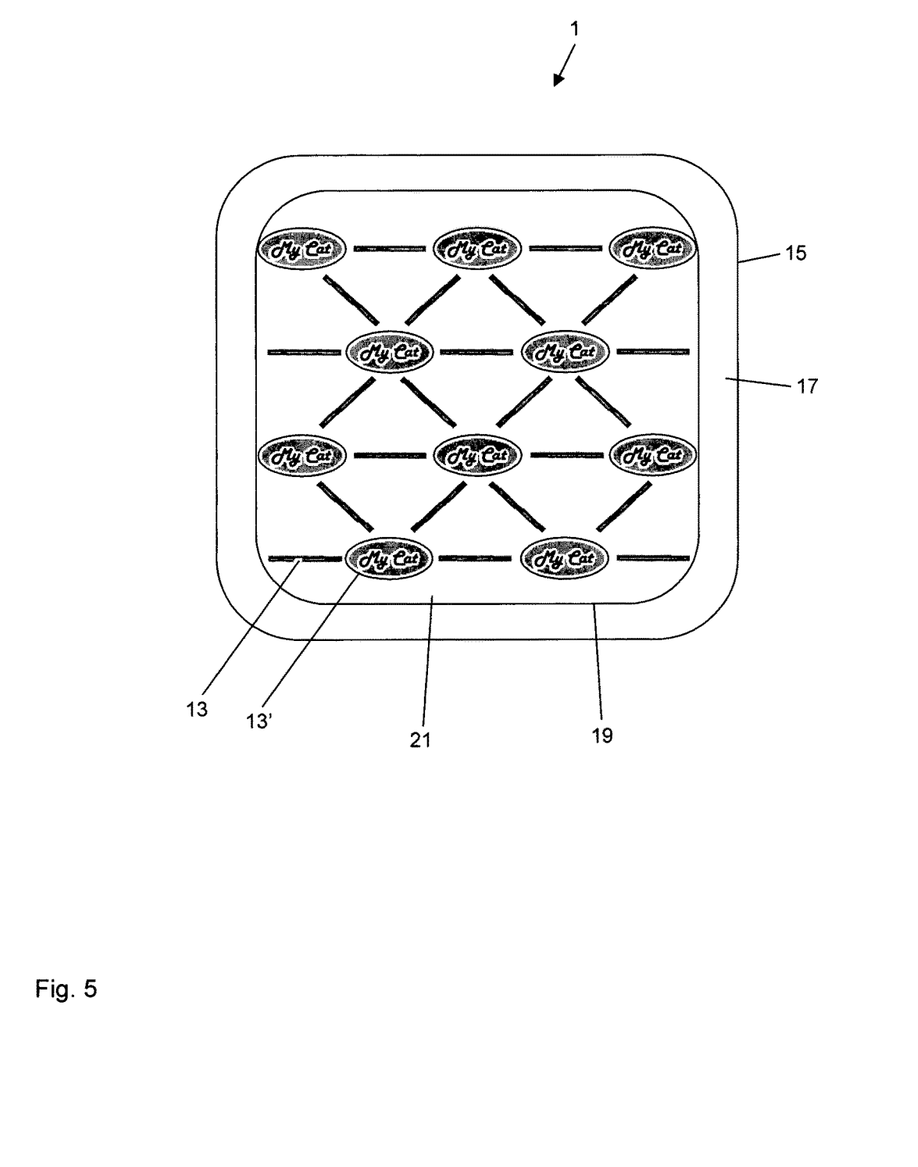
FIG. 5 shows an embodiment of the lid film with a third type of three-dimensional structures.

FIG. 5 shows another embodiment of the lid film 1 whereby the lid film 1 comprises different types of three-dimensional structures 13 and 13', such as lines and ellipses, the latter including the word "My Cat". These structures are again arranged in the central area 21 of the lid film 1 and do not extend to the sealing area 17 located between the edge 15 and the margin 19 of the central area 21.

Figure 6:
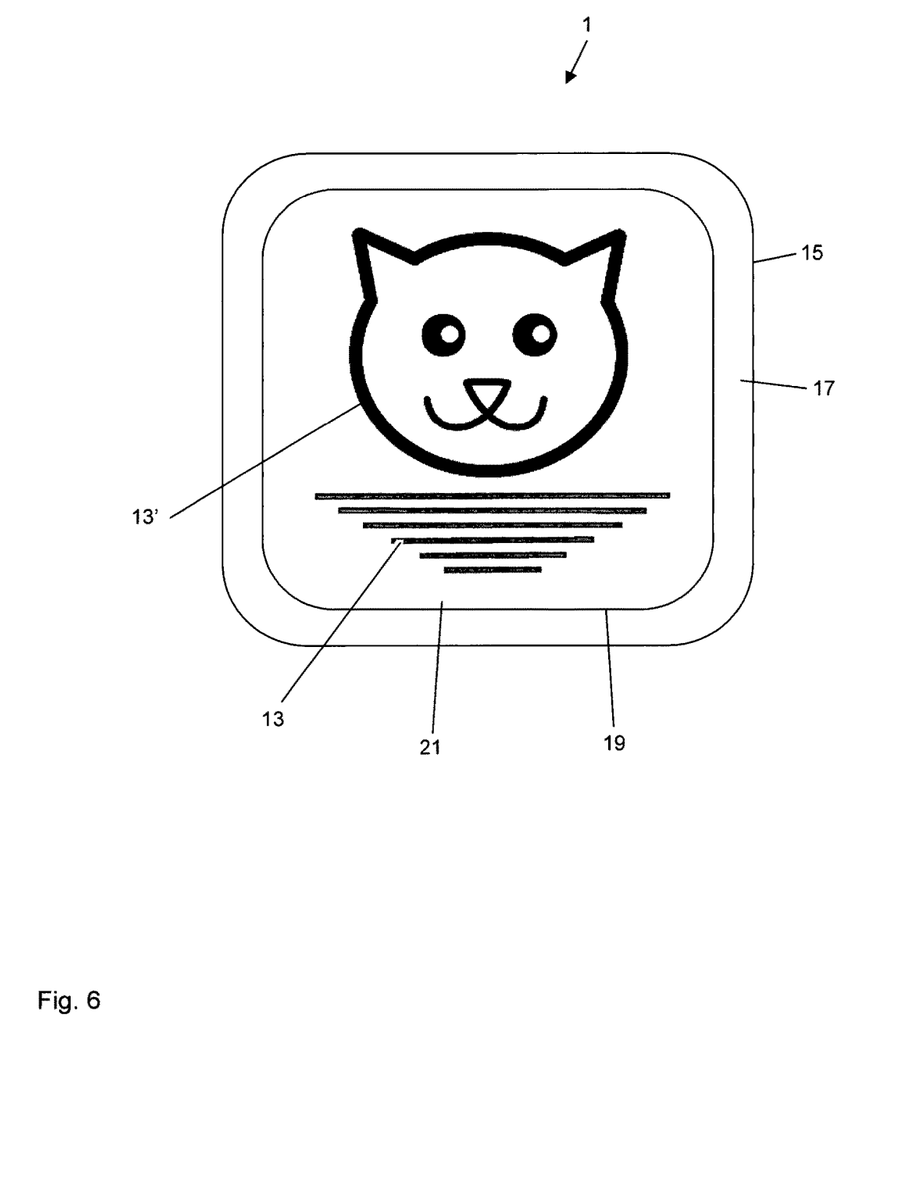
FIG. 6 shows an embodiment of the lid film with a further type of three-dimensional structures.

FIG. 6 shows an embodiment of the lid film 1. The three-dimensional structures 13, 13' include different types of three-dimensional structures such as lines and a stylized head of a cat. The three-dimensional structures 13, 13' are arranged in the central area 21 of the lid film 1 whereas the sealing area 17 delimited by the edge 15 and the margin 19 is kept free of three dimensional structures 13, 13'.

Figure 7:
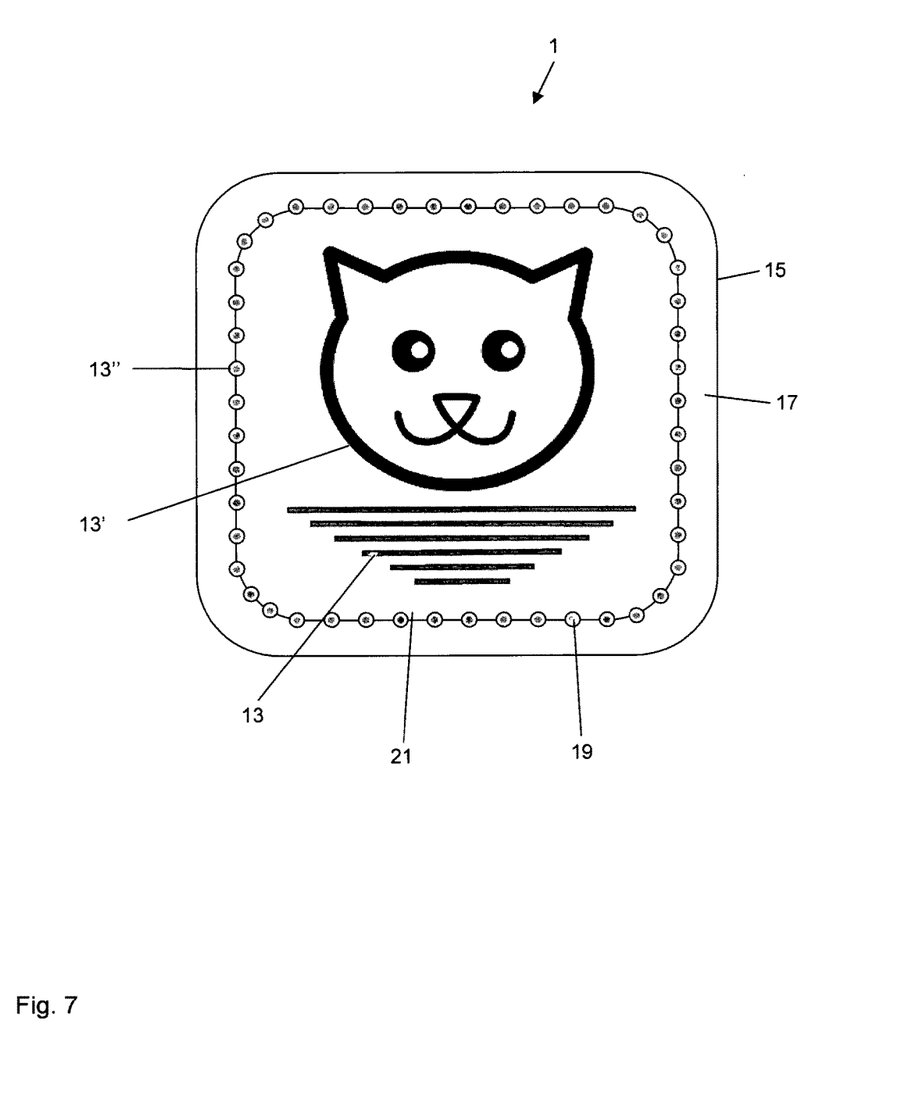
FIG. 7 shows another embodiment of the lid film with different three-dimensional structures.

FIG. 7 shows the same embodiment as seen in FIG. 6 whereby an additional type of a three-dimensional structure 13" in the form of round dots is comprised. These dots 13" are arranged at even distance on the margin 19 of the central area 21 and thus extend into the sealing area 17 of the lid film 1.

Figure 8:
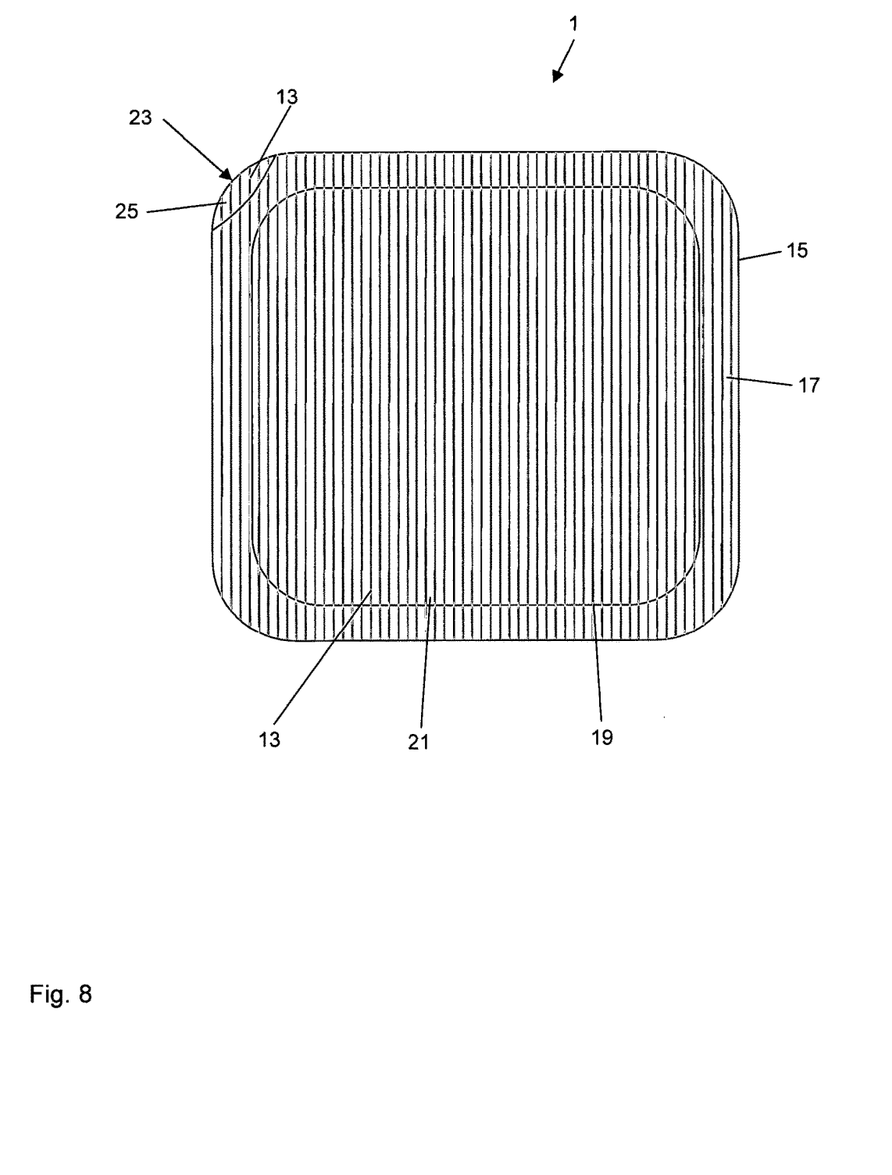
FIG. 8 shows a further embodiment of the lid film with three-dimensional structures extending over the entire lid film.

FIG. 8 shows a further embodiment of the lid film 1. While there is only one type of three-dimensional structures 13, lines, these three-dimensional structures are arranged on the whole surface of the lid film 1. This means they extend not only over the central area 21 but also to the sealing area 17 which is delimited by the edge 15 and the margin 19 of the central area 21. In the upper left corner an opening flap 23 is shown which is fully covered with three-dimensional structures 13. The opening flap 23 is formed by a non-sealing area 25, i.e., in the non-sealing area the lid film is not sealed to a container (not shown) so that the lid film 1 may be easily pinched and lifted off the container in order to open the container. It should also be noted that the opening flap 23 does not protrude the edge of the container.

Figure 9:
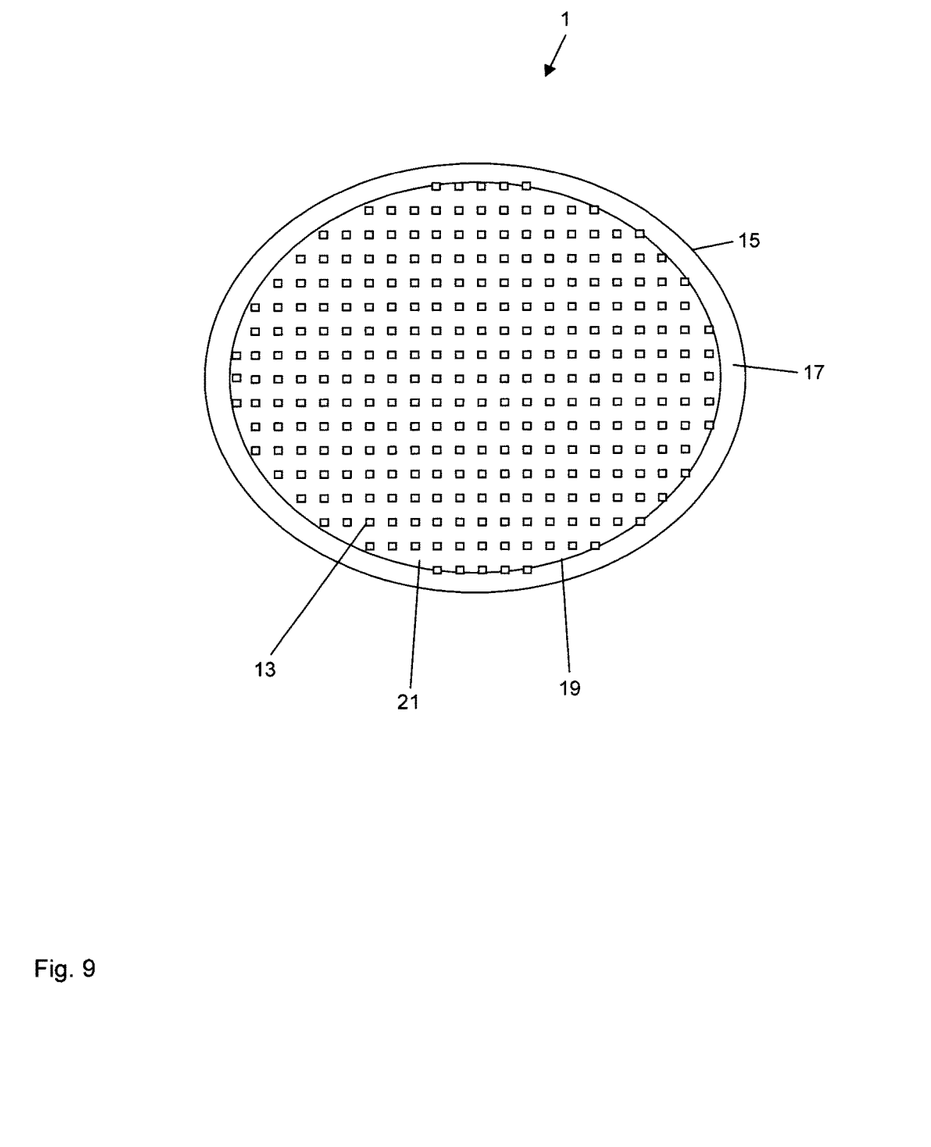
FIG. 9 shows another embodiment of the lid film.

FIG. 9 shows another embodiment of the lid film 1. The lid film 1 has an oval shape. The three dimensional structures 13 are quadratic dots arranged in the central area 21. The sealing area 17 between the edge 15 and the margin 19 of the central area 21 is free of three dimensional structures 13.

Figure 10:
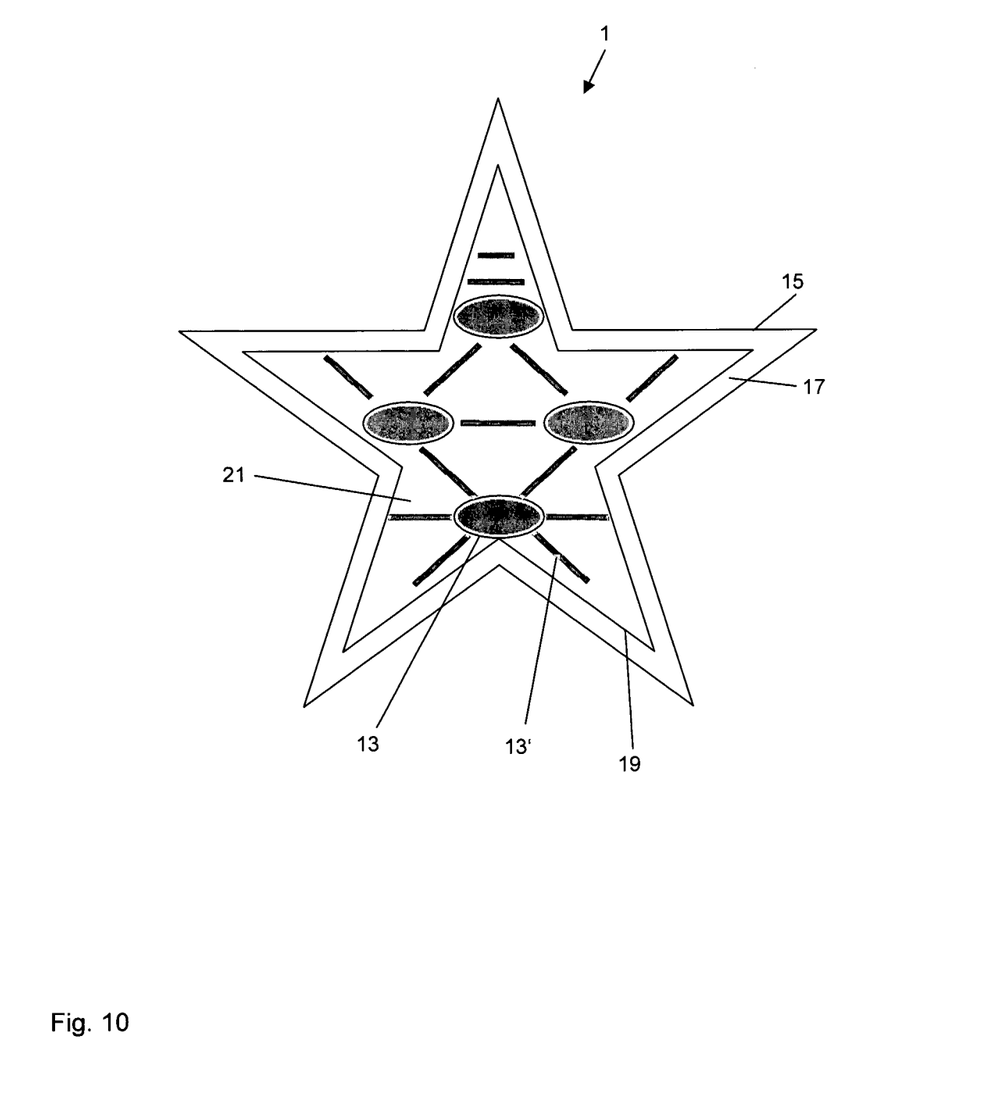
FIG. 10 shows a further embodiment of the lid film.

FIG. 10 shows a lid film 1 that has a star-like shape. Two different three dimensional structures 13 and 13' are arranged in the central area of the lid film. There are no three dimensional structures 13 and 13' within the sealing area 17 arranged between the edge 15 and the margin 19 of the central areal 21.

Figure 11:
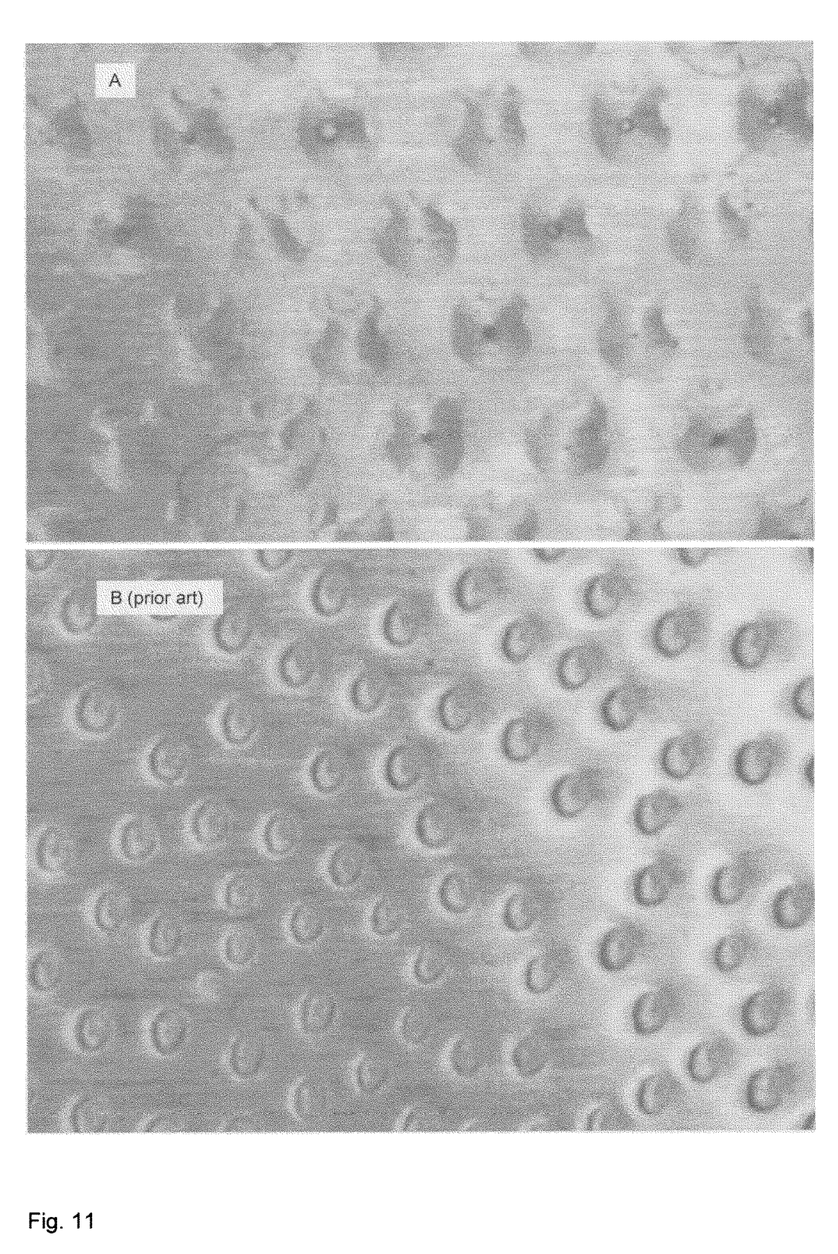
FIG. 11 shows the outer side of a lid film according to the present invention comprising a relief layer and the outer side of an embossed lid film of the prior art.

FIG. 11 shows the outer side A of a lid film according to the present invention comprising a relief layer. The three-dimensional structures 13 have a dot-like form. Also shown is the outer side B of an embossed film of the prior art. As the outer side of the prior art film is embossed there are no three-dimensional structures on the outer side of the prior art film. There are rather embossing marks in the form of tiny indentations.

Figure 12:
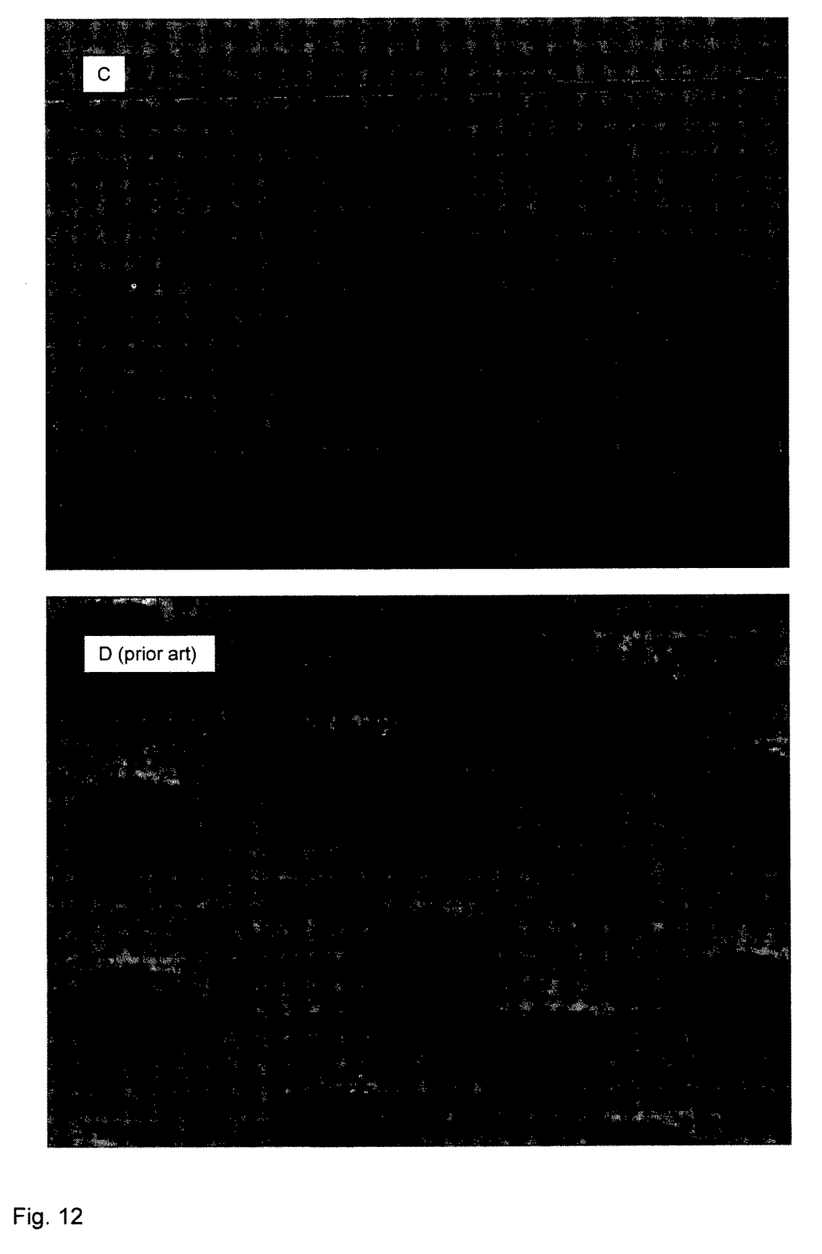
FIG. 12 shows the inner side of a lid film according to the present invention and the inner side of an embossed lid film of the prior art.

FIG. 12 shows the inner side C the lid film according to the present invention which is completely flat. The inner side D of the prior art lid film on the other hand shows numerous protrusions caused by the embossing of the outer side.

The invention claimed is:

1. A lid film for packaging having a multi-layer structure comprising a sealing layer, a barrier layer, a print primer layer, a print layer, an optional print protection layer, and a relief layer, wherein the sealing layer, the barrier layer, the print primer layer, the print layer and the optional print protection layer are essentially flat, wherein the relief layer is arranged at least on a part of the print layer or on the optional print protection layer and comprises at least n three dimensional structures per $cm^2$, wherein n is at least 1, projecting at an essentially right angle from a surface of the adjacent print layer or the optional print protection layer and said three dimensional structures forming an non-continuous elevated surface, wherein the total of said elevated surface area formed by the three dimensional structures equals at least m % of a total surface area of the lid film, m being at least 10%, wherein the three dimensional structures have a minimal height of 5 μm, and wherein the lid film is sterilizable.

2. A lid film according to claim 1, wherein n is in the range of 1 to 100.

3. A lid film according to claim 1, wherein m is in the range of 10% to 50%.

4. A lid film according to claim 1, wherein the three dimensional structures of the relief layer are randomly arranged on the surface of the optional print protection layer or the print layer.

5. A film according to claim 1 wherein the three dimensional structures of the relief layer are arranged on the surface of the optional print protection layer or the print layer in a regular array.

6. A lid film according to claim 1, wherein the relief layer is made of a one or more acrylic lacquers comprised of at least one acrylic resin and at least one photoinitiator hardened by radical polymerization initiated by UV radiation which is or are colorless.

7. A lid film according to claim 1, wherein the relief layer is made of one or more acrylic lacquers comprised of at least one acrylic resin and at least one photoinitiator hardened by radical polymerization initiated by UV radiation which is or are colored.

8. A lid film for food packaging according to claim 1, wherein the three dimensional structures of the relief layer have a height in the range of 5 μm to 45 μm.

9. A lid film for food packaging according to claim 1, wherein the barrier layer comprises aluminium and has a thickness in the range of 20 μm to 90 μm.

10. A film according to claim 1, wherein the lid film comprises an opening flap arranged at an edge of the lid film, said opening flap being at least partially covered by the relief layer.

11. A food pack comprising a lid film according to claim 1.

12. A method for the manufacture of a lid film according to claim 1 comprising the steps of coating a barrier layer with a sealing layer on one side and with a print primer layer on the opposite side of the barrier layer, applying a print layer on the print primer layer by printing, and applying a relief layer on the print layer by printing, wherein the relief layer is made of a colorless or a colored lacquer, and wherein the lid film is sterilizable.

13. A method for the manufacture of a lid film according to claim 12, wherein the printing is done by UV-flexoprint and wherein the colorless or colored lacquer is bisphenol A free.

14. A lid film according to claim 1, wherein n is in the range of 3 to 50.

15. A lid film according to claim 1, wherein m is in the range of 15% to 40%.

16. A lid film for food packaging according to claim 1, wherein the three dimensional structures of the relief layer have a height in the range of 7 μm to 30 μm.

17. A lid film for food packaging according to claim 1, wherein the barrier layer comprises aluminium and has a thickness in the range of 40 μm to 80 μm.

18. A film according to claim 1, wherein the lid film comprises an opening flap arranged at an edge of the lid film, said opening flap being fully covered by the relief layer.

19. A lid film for packaging having a multi-layer structure comprising a sealing layer, a barrier layer, a print primer layer, a print layer, an optional print protection layer, and a relief layer, wherein the sealing layer, the barrier layer, the print primer layer, the print layer and the optional print protection layer are essentially flat, wherein the relief layer is arranged at least on a part of the print layer or on the optional print protection layer, is made of a solvent-free UV-flexoprint ink cured by UV radiation or an acrylic lacquer comprised of at least one acrylic resin and at least one photoinitiator hardened by radical polymerization initiated by UV radiation, and comprises at least n three dimensional structures per $cm^2$, wherein n is at least 1, projecting at an essentially right angle from a surface of the adjacent print layer or the optional print protection layer and said three dimensional structures forming an non-continuous elevated surface, wherein the total of said elevated surface area formed by the three dimensional structures equals at least m % of a total surface area of the lid film, m being at least 10%, and wherein the three dimensional structures have a minimal height of 5 μm.

* * * * *